Patented May 31, 1932

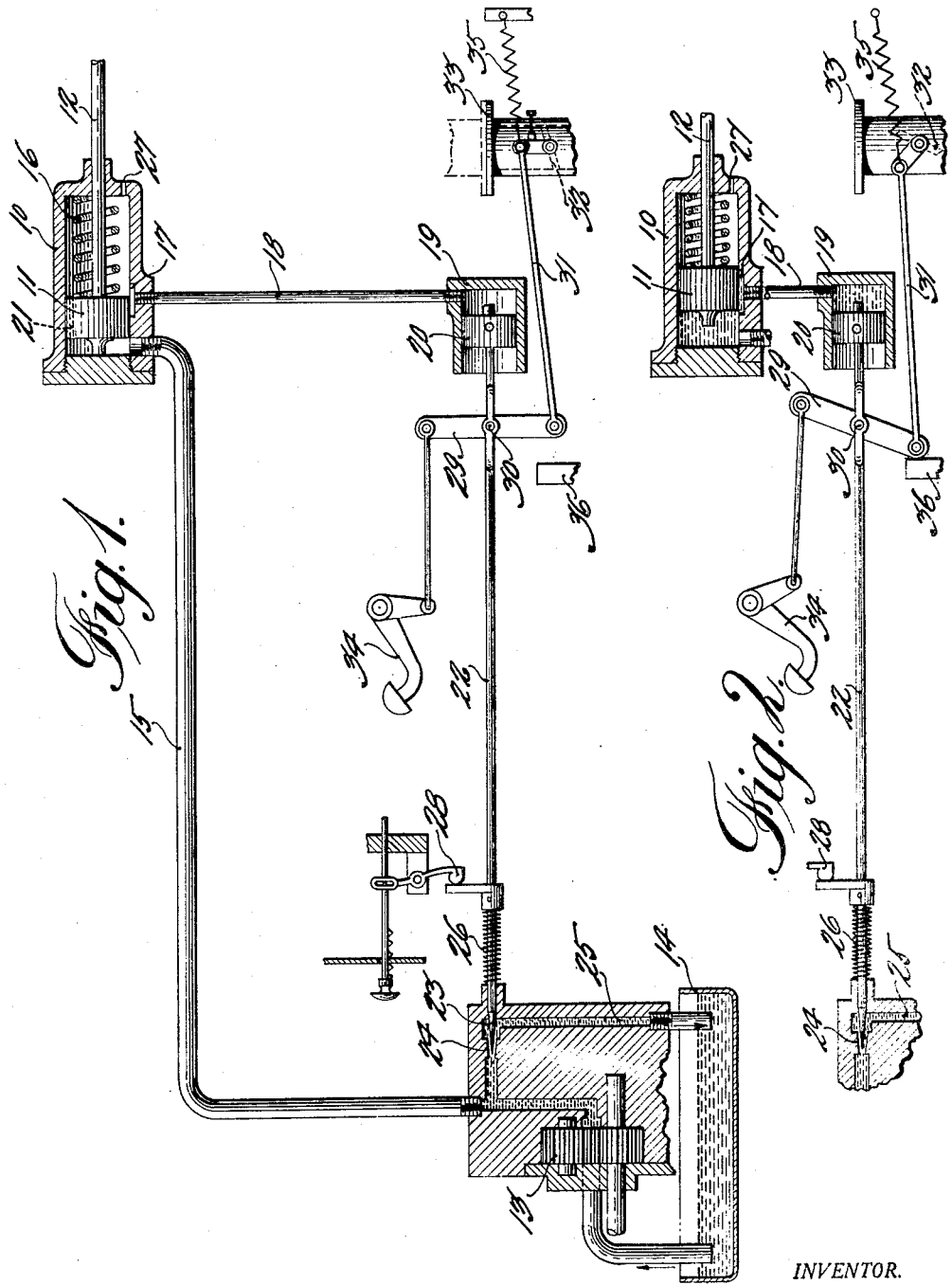

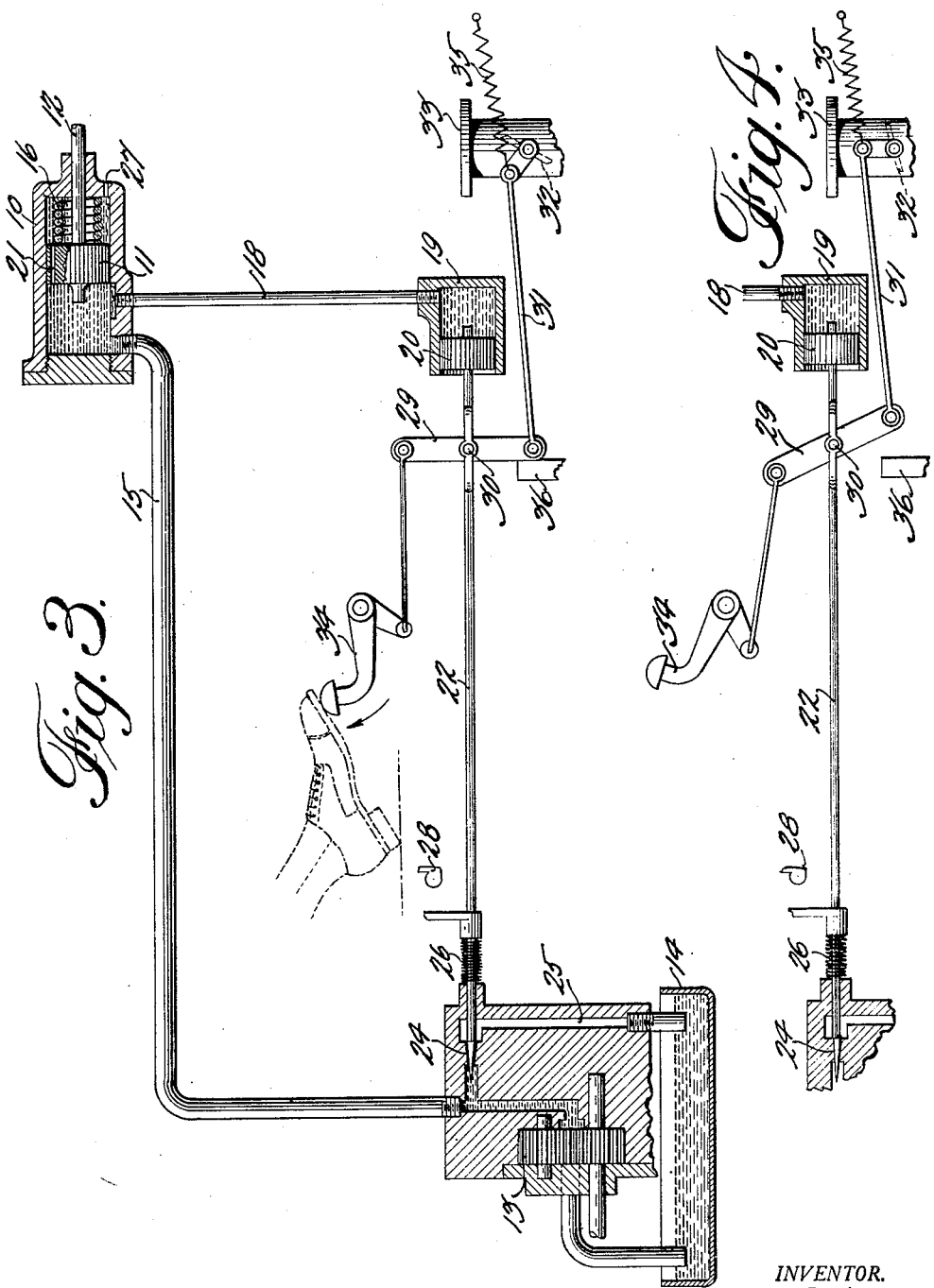

1,861,008

UNITED STATES PATENT OFFICE

FRANK A. HAYES, OF MIDDLETOWN, NEW JERSEY

FRICTION TRANSMISSION CONTROL DEVICE    REISSUED

Application filed November 10, 1930. Serial No. 494,608.

This invention relates to control systems for variable speed transmissions, and more particularly to a control system used in conjunction with the speed ratio change mechanism of a friction transmission adapted for automotive use.

The present invention features a hydraulic control in which a cylinder provided with a piston to actuate the speed ratio control of the transmission is employed, the amount of actuating fluid supplied to said cylinder being dependent upon the speed of the engine or driving means and under the control of the operator.

The present disclosure constitutes an improvement over the system shown and described in my Patent No. 1,698,229 in which the pressure is made dependent upon the speed of the engine by driving a pump at engine speed and providing an orifice to partially relieve the pressure, the opening of this orifice being under the control of the operator.

An object of the invention is to provide an improved control mechanism of the kind specified in which the amount of fluid pressure developed is directly dependent upon the speed of the engine which drives the vehicle and at all times under the control of the operator by the usual foot movement.

A further object of the invention is to provide a simple and highly efficient hydraulic mechanism for the actuation of a variable speed transmission in which the fluid pressure is under the control of the operator by the use of the usual foot lever which will serve the dual purpose of governing both the throttle and the fluid pressure without departing from the conventional method of operating a motor vehicle.

In the conventional motor vehicle the operator having attained the desired speed (usually considerably below the maximum available) holds the vehicle at that speed by raising his foot and allowing the accelerator pedal to rise and thus throttle the engine. The result is that the engine is operating at relatively high speed depending upon the vehicle speed and at relatively small throttle opening, a condition under which efficiency is relatively low and fuel consumption high in the sense of fuel consumed per unit of travel. In this invention however, when the operator having attained the desired speed, allows the accelerator pedal to rise, the throttle remains wide open and the speed ratio of the transmission increases so that at all times the vehicle will be operating at maximum throttle and minimum engine speed for any given speed and road condition within range of the device. This results automatically in providing maximum efficiency, minimum fuel consumption, and, owing to the slow speed of the engine and the resulting freedom from noise and vibration, a maximum of driving convenience and comfort. At the same time, the driver's method of driving the vehicle has not been changed at all, as the action is entirely automatic as far as he is concerned.

Various other objects and advantages of the invention will be in part obvious from an inspection of the accompanying drawings and a careful consideration of the subjoined description of one form of mechanism embodying my invention.

From the detailed description of the embodiment illustrated in the accompanying drawings, it will be seen that the invention in its preferred form provides what may be conveniently termed a two range or two stage operation. In the first stage the car velocity is controlled by varying the throttle opening, and at any given throttle opening the engine speed remains more or less constant, the speed ratio of the transmission varying automatically to suit road conditions and the like; whereas in the second stage the car velocity may be controlled entirely by varying the speed ratio of the transmission, the engine throttle remaining wide open. In this stage the velocity control may be obtained by control of the fluid pressure which operates the ratio changing mechanism, and this control may be obtained by operation of the accelerator pedal in the customary manner, depressing the pedal for higher velocity and allowing it to rise for lower velocity.

In the drawings:

Figure 1 is a vertical longitudinal section diagrammatically illustrating one form of the present invention.

Figures 2, 3 and 4 are views similar to Fig. 1, showing the elements in various moved positions.

With reference to the drawings, 10 designates a cylinder in which a piston 11 is hydraulically operated, said piston being provided with a rod 12 that is connected to a variable speed ratio control mechanism of a transmission (not shown) between the engine and the driving wheels of the car. The cylinder is supplied with a fluid under pressure by a suitable form of pump 13 preferably operated by the same power means that drives the transmission, said fluid being conveyed from the sump 14 to the cylinder by a duct or pipe 15. The piston 11 may be returned by a spring 16 or the return can be made by hydraulic or other means.

The cylinder 10 is provided with an elongated port 17, and a duct 18 extends from said port to a further cylinder 19 provided with a piston 20, the last said piston being connected to one end of a rod 22, and the opposed end of said rod being preferably tapered at 23 so as to form one element of a needle-valve 24. This needle-valve is directly actuated by the piston 20 which is in turn actuated by the fluid pressure when the same exceeds the opposing pressure of the spring 16 in the cylinder 10. The valve 24 acts as a bleeder and is adapted to relieve the pressure in the duct 15 and permit some of the fluid to by-pass back into the sump 14 by means of the duct 25. It will be clear that the valve determines the ratio of fluid pressure to engine speed, the ratio increasing as the valve approaches closed position and decreasing as the valve opens. A spring 26 tends to normally maintain the rod 22 against a manually settable stop 28 in which position the valve 24 will be open. In conjunction with the valve 24 the stop just mentioned constitutes a speed control adjusting means which or as the speed referred to is reached or approached is set by the operator previous to the starting of the vehicle so that the engine may be operated within a certain predetermined speed range as will be further herein described. It will be observed that part of the liquid delivered by the pump 13 is by-passed to the sump 14 and hence the pressure on piston 11 for a given engine speed depends upon the amount of oil by-passed, which in turn depends upon the capacity of valve 24. This capacity is itself determined as to its upper limit by the stop 28, which determines the maximum opening of the valve. Thus the setting of the valve by the stop 28 determines the maximum speed at which the engine can run without causing an increase of speed ratio. Preferably the stop is set for the speed at which the engine can develop its maximum power, so that maximum power can be obtained when desired. As the valve is moved toward closed position the ratio of fluid pressure to engine speed is increased, as already stated, with greater movement of piston 11 for a given increase of engine speed.

A floating lever 29 is pivotally mounted on the rod 22 at 30, the lower end of said lever being connected by a link 31 to the valve 32 of a throttle 33, and the other end of the lever being connected in any suitable manner to a foot actuated throttle lever 34. A spring 35 normally tends to maintain the throttle valve in a closed condition.

The throttle referred to is the one that controls the speed of the engine (not shown) which constitutes the power means for the transmission hereinbefore mentioned. The rod 22 may if desired be connected to a suitable form of governor which is responsive to engine speed thus automatically regulating the pressure in the duct or pipe 15 in conformity with the engine speed.

A stop 36 is provided to limit the travel of the rod 31 and the swing of lever 29.

A passage 21 extends through the piston 11 and a further passage 27 is formed in the cylinder 10, the purpose of which will be described hereinafter.

In operation:

Assuming that the elements are in their normal or initial positions as shown in Fig. 1 with the engine running at idling speed and the pump 13 operating at low pressure due to the reduced engine speed, the operator having previously set the speed control stop 28 and the valve 24 to a position of desired engine speed in a low speed ratio and started the vehicle into motion, now pushes the foot throttle lever 34 fully down thus moving the lower end of the lever 29 against the stop 36 and fully opening the throttle 33 as shown in Fig. 2. This action will increase the engine speed and accelerate the vehicle in the low gear ratio until the engine has reached the speed for which the stop 28 has been set, or as the speed referred to is reached or approached the fluid will be forced through the duct 15 with sufficient pressure to actuate the piston 11 against the opposition of the spring 16. The vehicle now accelerates at more or less constant engine speed until the desired maximum vehicle speed has been reached due to the increase in the transmission ratio brought about by the movement of the piston 10 and the rod 12 which controls the various speed ratios. The engine speed stays more or less constant because if it increases, the increased oil pressure increases the transmission speed-ratio, thereby loading the engine still more and causing its speed to decrease or to cease increasing.

Relatively early in its movement, the piston 11 covers the port 17 and then immediately opens it again to the pressure from pressure pipe 15 thus permitting the fluid from the pipe to be conducted by means of the duct 18 to the cylinder 19 where it will tend to actuate the piston 20. It will be readily understood from Fig. 2 that as long as the operator holds the throttle lever 34 fully depressed, the movement of the piston 20 will be restrained, and as long as the pedal is maintained in this position the vehicle will continue to accelerate up to the maximum velocity at which the full power of the engine is capable of driving it, while the transmission automatically sets itself to the correct ratio for the maximum vehicle speed attained.

Let us assume now that the engine speed has been set by the position of stop 28 for maximum engine power and the operator desires to obtain maximum acceleration of the car up to moderate speed, say about 30 miles or 50 kilometers per hour, and then to continue driving at that velocity. The procedure is the same as above described except that when the desired velocity has been reached, the driver relieves the pressure on the throttle lever 34 and allows it to rise (Fig. 3). The lever 29 now swings counterclockwise about its lower end since the fluid pressure on the piston 20 is greater than the power of the spring 35; and hence, as the driver allows the pedal 34 to rise (which it will be observed is the normal and usual method of operating a motor car when decrease of car velocity is desired) rod 22 will move leftwardly thus closing valve 24 more or less, thereby increasing the pressure in the duct 15 and causing piston 11 and rod 12 to be moved still further to the right so that the transmission ratio continues to increase, thus loading the engine and causing its speed to be proportionately reduced while the vehicle remains at practically constant velocity during which the engine continues to operate at wide open throttle.

Supposing now that the power required to drive the vehicle at a given velocity is less than that developed by the engine at its corresponding speed with the transmission at its maximum ratio, or with the engine at the lowest speed at which the operator desires to run it due to possible preignition, vibration or other causes. When this condition is reached the car will again tend to accelerate, and to keep it at constant velocity the operator will allow the pedal 34 to rise still further. If the rod 22 is not already at its limit of leftward movement it will further restrict valve 24 and may even close the valve entirely (Fig. 4), after which lever 29 fulcrums about its center pivot 30 to decrease the throttle opening until such a time as the desired lower velocity is regained.

With reference to Fig. 3 and particularly to Fig. 4 it will be seen that with a closed throttle opening and the resultant reduction in engine speed the valve 24 nevertheless is still in its closed position and that due to this condition there would still apparently be maintained a certain amount of pressure presumably enough to prevent the return of the piston 11 by the spring 16. To provide a positive means for the relief of this pressure, the orifice 21 of small caliber is provided in the piston 11 to permit the fluid to be displaced to the other side of the cylinder where it may escape through the orifice 27 and preferably be conducted back to the sump. The return of the piston 11 by the spring 16 will cut off any pressure in cylinder 19 and allow oil from the latter to flow to the right of piston 11 and escape through port 27 to the sump. Valve 24 can then open.

The description may be summarized as follows:

*Figure 1*.—Throttle is closed and it is assumed that engine is idling. Valve 24 is open which results in practically no fluid pressure. The position of piston 11 indicates that the transmission is in low gear.

*Figure 2*.—Throttle has been fully opened, valve 24 is still open thus preventing the maximum pressure in cylinder 10 which could otherwise result from increased engine speed. Vehicle is being accelerated in low gear and as its velocity increases the piston 11 will gradually move to the right thereby changing the transmission towards a higher ratio position due to slowly increasing pressure and car velocity, thus permitting the fluid to enter cylinder 19 under some pressure. The position of the accelerator pedal or lever 34 which is being held down, prevents the piston 20 from moving and closing the valve 24. If the operator continues to hold the accelerator pedal down, the engine will drive the car at maximum velocity, the piston 11 setting the transmission to the speed ratio best suited therefor. This is due to the fact that if the speed ratio gets too high or the road resistance increases, the engine speed will decrease, thereby decreasing the pressure on the piston and permitting it to drop back and decrease the speed ratio until the engine again accelerates to the speed at which it develops its maximum power.

*Figure 3*.—Throttle still fully open. Lever or pedal 34 has been allowed to rise somewhat thus relieving the restraint to the movement of piston 20 and accordingly valve 24 is in the act of closing, thus gradually creating higher and higher pressure in cylinder 10 which moves piston 11 still further towards high gear position and thus causes decrease of engine speed.

*Figure 4*.—Lever 34 has been released thus initially closing throttle. Transmission is still in high gear since valve 24 has not as yet reopened. As the pressure drops (because of decreasing engine speed due to the closing of the throttle and consequent or other decrease of car velocity) below the power of the spring 16 the piston 11 will be returned to the low gear position and valve 24 will be reopened by the spring 26.

Variations may be resorted to within the scope of the invention and portions of the improvements may be used without the others whilst not departing from the spirit of the invention.

Having thus described my invention, I claim:

1. In apparatus of the class described, the combination with the speed ratio changing mechanism of a transmission driven by a power means provided with operator-operable speed-control means, of a means responsive to fluid pressure to actuate said mechanism in proportion to such pressure, means to develop the fluid pressure on said actuating means in proportion to the speed of the power means, and a means actuated by the fluid pressure subject to said operator-operable control means to regulate the fluid pressure independently of the speed of the power means.

2. The combination with a transmission driven from a power means and provided with a speed changing mechanism, of a fluid pressure means adapted to actuate said mechanism from a low to a higher speed ratio, a power driven means to produce the fluid pressure, an operator-operable control for the power means, and a means actuated by the fluid pressure subject to said operator-operable control to vary the fluid pressure independently of the power means.

3. The combination with a transmission driven from a power means and provided with a speed ratio changing mechanism, of a fluid pressure means adapted to actuate said mechanism from a low to a higher speed ratio, a driven means to produce the fluid pressure, an operator-operable speed control for the power means, and a valve adapted to be actuated by the fluid pressure subject to said operator-operable control means to vary the fluid pressure as desired.

4. In a vehicle driven from a power means and provided with a transmission having a speed ratio changing mechanism, the combination of a hydraulic control system for said mechanism comprising a fluid pressure supply means driven by the power means, a means responsive to the fluid pressure to actuate said mechanism to vary the vehicle driving ratio thereof in accordance with the magnitude of the pressure developed, an operator-operable control means for the power means, and a fluid pressure actuated valve adapted when open to reduce the fluid pressure; said valve being under the control of the operator-operable means and responsive to the fluid pressure only when released by said manual control.

5. In a vehicle driven from a power means and provided with a transmission having a speed ratio changing mechanism, a hydraulic control system for said mechanism comprising a cylinder, a piston in said cylinder connected to said mechanism and responsive to fluid pressure to change the speed ratio, a fluid pressure supply means driven from said power means and connected to said cylinder, operator-operable means for controlling the speed of the power means, a valve to control the fluid pressure, and fluid pressure means to actuate said valve under the control of the said operator-operable means.

6. In a vehicle driven from an operator controlled power means and provided with a transmission having speed ratio changing mechanism, the combination of a hydraulic control system for said mechanism comprising a cylinder, a piston within the cylinder connected to said mechanism and responsive to fluid pressure to change the speed ratio, a fluid pressure supply means driven from said power means and connected to said cylinder to supply fluid under pressure thereto, a valve to control the pressure, a further cylinder connected with the first said cylinder by a duct and having a piston to operate said valve by fluid pressure from the first cylinder, said duct being opened to the pressure by a movement of the first said piston, a connection between the last said piston and the power control to restrain the movement of the piston and valve until manually released.

7. In a vehicle driven from a power means controlled by a throttle and provided with a transmission having speed ratio changing mechanism, the combination of a hydraulic control system for said mechanism comprising a cylinder, a piston within the cylinder connected to said mechanism and responsive to fluid pressure to change the speed ratio, a fluid pressure supply means driven from the power means and connected to said cylinder, a valve to control the pressure, a manually settable stop to limit the opening of said valve, a further cylinder connected with the first said cylinder by a duct and having a piston to operate said valve; said duct being opened or closed to the pressure by a movement of the first said piston, and operator-operable means to actuate the throttle and to release said valve to permit closing movement thereof.

8. In apparatus for control of the velocity of a motor vehicle provided with a transmission having speed ratio changing mechanism and driven by an engine having a throttle to control the engine speed, the combination of automatic means to actuate the ratio changing mechanism in proportion to engine speed, operator-operable means to open the throttle, and means operable by the operator after a desired velocity has been attained to vary the speed ratio of the transmission while maintaining a predetermined constant throttle opening.

9. In apparatus for control of the velocity of a motor vehicle provided with a transmission having speed ratio changing mechanism and driven by an engine having a throttle to control the engine speed, the combination of automatic mechanism to actuate the ratio changing mechanism, means to open the throttle for increasing the velocity of the vehicle, means operable by the operator after a desired velocity has been attained to vary the speed ratio of the transmission and thereby control the speed of the vehicle while maintaining a predetermined constant throttle opening, and operator-operable actuating means common to both said means.

10. In apparatus comprising a transmission having speed ratio changing mechanism and adapted to be driven by an engine having a throttle, the combination of engine driven fluid pressure supply means to deliver fluid at a pressure proportional to the speed of the engine, fluid pressure means actuated by fluid from said supply means to operate the ratio changing mechanism, fluid pressure actuated means operable automatically to increase the ratio of fluid pressure to engine speed when the transmission attains a predetermined speed ratio, and operator-operable means to operate the engine throttle and to control the operation of said fluid-pressure actuated automatic means.

11. In an apparatus comprising a transmission having speed ratio changing mechanism and adapted to be driven by an engine having a throttle, the combination of engine driven fluid pressure supply means to deliver fluid at a rate proportional to the speed of the engine, fluid pressure means actuated by fluid from said supply means to operate the ratio changing mechanism, operator-operable means to operate the engine throttle and thereby vary the engine speed and the fluid pressure in an initial speed ratio range, and fluid pressure actuated means controlled by the operator-operable means in a second speed ratio range to vary the fluid pressure independently of the throttle.

12. In an apparatus comprising a transmission having speed ratio changing mechanism and adapted to be driven by an engine having a throttle to control the engine speed, the combination of fluid pressure means to actuate the ratio changing mechanism, means for supplying actuating fluid to said means at a pressure proportional to the speed of the engine until a predetermined speed ratio of the transmission is attained, fluid pressure means controlled by the first fluid pressure means to control the fluid pressure after said predetermined speed ratio is attained, and operator-operable means to operate the engine throttle and connected with the last mentioned fluid pressure control means to operate the same independently of the throttle after said predetermined speed ratio is attained.

13. In an apparatus adapted for two stage operation of a motor vehicle provided with a transmission having speed ratio changing mechanism and driven through the transmission by an engine having a throttle to control the engine speed, the combination with automatic means to actuate the speed-ratio changing mechanism of the transmission in response to the speed of the engine as varied by the throttle opening, of means ineffective below and operable by the operator above an intermediate ratio to vary the rate of response of said automatic means to engine speed.

14. In an apparatus adapted for two stage operation of a motor vehicle provided with a transmission having speed ratio changing mechanism and driven through the transmission by an engine having a throttle to control the engine speed, the combination with automatic means to actuate the speed-ratio changing mechanism of the transmission in response to engine speed as varied by the throttle opening, of operator-operable means to vary the rate of response of the automatic means at speed ratios above an intermediate ratio, and adustable means to predetermine the maximum engine speed at which such intermediate speed ratio is attained.

15. In an apparatus for two stage operation of a motor vehicle provided with a transmission having speed ratio changing mechanism and driven through the transmission by an engine having a throttle to control the engine speed, the combination of mechanism operating automatically to actuate the ratio changing mechanism between a low and a higher speed-ratio in response to the speed of the engine as varied by the throttle, means ineffective at speed ratios below and automatically operable at speed ratios above said higher speed-ratio to vary the response of the speed ratio changing mechanism to the engine speed, and operator-operable means ineffective below and effective above said higher speed ratio to control the response varying operation of said automatic means independently of the engine speed.

16. Apparatus of the class described, comprising in combination, fluid pressure actuated mechanism having a movable member adapted to operate the speed ratio changing mechanism of a transmission driven by power means the speed of which is controllable by operator-operable means, means adapted to supply fluid to said fluid pressure mechanism at a pressure proportional to the speed of the power means, a valve movable to vary the ratio of fluid pressure to the speed of the power means, fluid pressure means to move said valve and receiving fluid pressure when the aforesaid member is in a predetermined speed ratio position, and operator-operable means for controlling the movement of said valve by the fluid pressure means.

17. Apparatus of the class described, comprising in combination, fluid pressure actuated mechanism having a movable member adapted to operate the speed ratio changing mechanism of a transmission driven by power means the speed of which is controllable by operator-operable means, means adapted to supply fluid to said fluid pressure mechanism at a pressure proportional to the speed of the power means, a fluid pressure relief valve movable to vary the ratio of fluid pressure to the speed of the power means, fluid pressure means adapted to move said valve and thereby increase the ratio of pressure to speed when the aforesaid member is in a predetermined speed ratio position, and operator-operable means for controlling the movement of said valve by the fluid pressure means.

18. Apparatus of the class described, comprising in combination, fluid pressure actuated mechanism having a movable member adapted to operate the speed ratio changing mechanism of a transmission driven by power means the speed of which is controllable by operator-operable means, means adapted to supply fluid to said fluid pressure mechanism at a pressure proportional to the speed of the power means throughout a speed ratio range between the lowest and a predetermined higher ratio, valve means to vary the ratio of fluid pressure to the speed of the power means, fluid pressure means to actuate said valve means and receiving fluid pressure when the aforesaid member is in a position corresponding to said higher ratio, and means operable thereafter by the operator to control the movement of said valve by the fluid pressure means independently of the speed of the power means.

19. Apparatus of the class described, comprising in combination, a fluid pressure cylinder and a piston movable therein adapted to actuate the speed ratio changing mechanism of a transmission driven by a power means, means adapted to supply fluid to said cylinder at a pressure proportional to the speed of the power means, a valve movable to vary the ratio of the fluid pressure to the speed of the power means, fluid pressure means to actuate said valve and to receive actuating fluid when the said piston reaches a predetermined speed ratio position, and operator-operable means to control the speed of the power means independently of the said valve in the speed ratio range below the said predetermined ratio and effective to control the movement of said relief valve independently of the speed of the power means at a speed ratio range above the predetermined ratio.

20. Apparatus of the class described, comprising in combination, a fluid pressure cylinder and a piston movable therein adapted to actuate the speed ratio changing mechanism of a transmission driven by a power means, means adapted to supply fluid to said cylinder at a pressure proportional to the speed of the power means, a relief valve movable to vary the ratio of the fluid pressure to the speed of the power means, fluid pressure means to actuate said valve and connected with the said cylinder to receive actuating fluid pressure therefrom only when the piston has advanced to a predetermined speed ratio position, and operator-operable means to control the speed of the power means independently of the said valve in the speed ratio range below the said predetermined ratio and effective to control the movement of said relief valve independently of the speed of the power means at a speed ratio range above the predetermined ratio.

21. Apparatus of the class described, comprising in combination, fluid pressure actuated mechanism having a movable member adapted to operate the speed ratio changing mechanism of a transmission driven by power means having speed-control means, means adapted to supply fluid to said fluid pressure mechanism at a pressure proportional to the speed of the power means, a valve movable to vary the ratio of fluid pressure to the speed of the power means, fluid pressure means to operate said valve and receiving fluid pressure for actuation thereby when the aforesaid member is in a predetermined speed ratio position, means common to the said valve and to the said speed-control means to actuate the latter before the fluid pressure valve operating means receives fluid pressure and to thereafter control the operation of the valve, and operator-operable means to operate said common means.

22. Apparatus of the class described, comprising in combination, a fluid pressure cylinder and a piston movable therein adapted to actuate the speed ratio changing mechanism of a transmission driven by an engine having a throttle, means adapted to supply fluid to said cylinder at a pressure proportional to the speed of the power means, a relief valve movable toward closed position to increase the ratio of the fluid pressure to the speed of the power means and toward open position to decrease such ratio, fluid pressure means to actuate said valve and to receive actuating fluid when the said piston reaches a predetermined speed ratio position, adjustable means to limit the opening movement of the valve and thereby determine the maximum engine speed necessary to cause movement of said piston to said predetermined speed ratio position, and operator-operable means to operate the throttle of the power means independently of the said valve in the speed ratio range below the said predetermined ratio and effective to control the movement of said relief valve independently of the speed of the power means at a speed ratio range above the predetermined ratio.

23. Apparatus of the class described, comprising in combination, a fluid pressure cylinder and a piston movable therein adapted to actuate the speed ratio changing mechanism of a transmission driven by a power means, means adapted to supply fluid to said cylinder at a pressure proportional to the speed of the power means, a valve movable in one direction to increase the ratio of the fluid pressure to the speed of the power means and in another direction to decrease such ratio, fluid pressure means to move said valve in the ratio-increasing direction, and to receive actuating fluid when the said piston reaches a predetermined speed ratio position, adjustable means cooperating with the valve to predetermine the minimum ratio of pressure to engine speed, and operator-operable means to control the speed of the power means independently of the said valve in the speed ratio range below the said predetermined ratio and effective to control the movement of said relief valve independently of the speed of the power means at a speed ratio range above the predetermined ratio.

24. In an apparatus comprising a transmission having speed ratio changing mechanism and adapted to be driven by an engine having a throttle, the combination of engine driven fluid pressure supply means to deliver fluid at a pressure proportional to the speed of the engine, fluid pressure means actuated by fluid from said supply means to operate the ratio changing mechanism, fluid pressure actuated means operable automatically to increase the ratio of fluid pressure to engine speed when the transmission attains a predetermined speed ratio, adjustable means to predetermine the minimum ratio of pressure to engine speed, and operator-operable means to operate the engine throttle and to control the operation of said automatic means.

25. In an apparatus comprising a transmission having speed ratio changing mechanism and adapted to be driven by an engine having a throttle, the combination of engine driven fluid pressure supply means to deliver fluid at a pressure proportional to the speed of the engine, fluid pressure means actuated by fluid from said supply means to operate the ratio changing mechanism, fluid pressure actuated valve means operable automatically to increase the ratio of fluid pressure to engine speed when the transmission attains a predetermined speed ratio, adjustable means to set the valve means for a predetermined minimum ratio of pressure to engine speed, and operator-operable means to operate the engine throttle and to control the operation of said automatic valve means.

26. Apparatus for control of the velocity of a motor vehicle provided with a transmission having speed ratio changing mechanism and driven by an engine having a throttle to control the engine speed, the combination of automatic mechanism to actuate the ratio changing mechanism in proportion to engine speed, means for opening the throttle, means operable after a desired velocity has been attained to vary the speed ratio of the transmission while maintaining a predetermined constant throttle opening, and an operator-operable device having actuating connection with both said means; said connection comprising a floating lever connected to said device and both said means.

27. Apparatus for control of the velocity of a motor vehicle provided with a transmission having a speed ratio changing mechanism and driven by an engine having a throttle to control the engine speed, the combination of automatic fluid pressure mechanism to actuate the ratio changing mechanism in proportion to engine speed, means to open the throttle, valve means operable after a desired velocity has been attained to vary the speed ratio of the transmission while maintaining a predetermined constant throttle opening, and operator-operable means for actuating said throttle opening means and said valve means, comprising a pedal, a floating lever connected at one end to the pedal, at the other end to the throttle opening means, and between its ends to said valve means, and means to limit the swing of the lever in its throttle opening movement.

Signed at Keyport, in the county of Monmouth and State of New Jersey, this 5th day of November, 1930.

FRANK A. HAYES.